(12) United States Patent
Nishiyama et al.

(10) Patent No.: US 7,640,349 B2
(45) Date of Patent: Dec. 29, 2009

(54) SYSTEMS AND METHODS FOR PROVIDING SECURE ACCESS TO HOUSEHOLD TERMINALS

(75) Inventors: Kazuhiro Nishiyama, Tokyo (JP); Seikei Lee, Saitama (JP); Takeshi Ishihara, Kanagawa (JP); Shinji Arakawa, Chiba (JP)

(73) Assignee: Sony Corporation, Tokyo (JP)

( * ) Notice: Subject to any disclaimer, the term of this patent is extended or adjusted under 35 U.S.C. 154(b) by 816 days.

(21) Appl. No.: 10/930,381

(22) Filed: Aug. 31, 2004

(65) Prior Publication Data

US 2005/0050214 A1  Mar. 3, 2005

(30) Foreign Application Priority Data

Sep. 1, 2003  (JP) ............................ P2003-309177

(51) Int. Cl.
  G06F 15/16  (2006.01)
  G06F 15/173  (2006.01)
(52) U.S. Cl. ................... 709/229; 709/223; 709/224; 709/226
(58) Field of Classification Search ................ 709/223, 709/224, 226, 229
  See application file for complete search history.

(56) References Cited

U.S. PATENT DOCUMENTS

| | | | | |
|---|---|---|---|---|
| 7,010,608 B2 * | 3/2006 | Garg et al. | ................... | 709/229 |
| 2004/0054789 A1 * | 3/2004 | Breh et al. | ................... | 709/229 |

FOREIGN PATENT DOCUMENTS

| | | |
|---|---|---|
| JP | 11-089073 | 3/1999 |
| JP | 2002-055895 | 2/2002 |
| JP | 2002-259678 | 9/2002 |
| JP | 2003-060800 | 2/2003 |
| JP | 2003-108504 | 4/2003 |

OTHER PUBLICATIONS

T. Berners-Lee, RFC 1945, Hypertext Transfer Protocol (HTTP/1.0), Published by IETF on May 1996.*
Hidemoto Nakada et al.; "Design Issues for Network Enabled Server Systems"; Information Processing Society of Japan Memoir, vol. 2000/57th, p. 69-74, 2000-HPC-81.

* cited by examiner

*Primary Examiner*—Nathan J Flynn
*Assistant Examiner*—Jeong S Park
(74) *Attorney, Agent, or Firm*—Finnegan, Henderson, Farabow, Garrett & Dunner, L.L.P.

(57) ABSTRACT

A communication between a terminal connected to the Internet, like a household terminal, and a server can be performed by simple processing at any time after security is ensured. In a case where control of a particular terminal connected to a predetermined network is performed from the server, when there is a predetermined processing request at the particular terminal from the server or an external terminal connected to the server, a callback request is sent to the server or the particular terminal. At the particular terminal receiving the callback request, a callback request response is made to the server by a predetermined communication method in which security is ensured, and instructions for performing predetermined processing by the predetermined communication method are sent, as a response from the server with respect to the callback request response, to the particular terminal.

12 Claims, 10 Drawing Sheets

SYSTEMS AND METHODS FOR PROVIDING SECURE ACCESS TO HOUSEHOLD TERMINALS

BACKGROUND OF THE INVENTION

1. Field of the Invention

The present invention relates to an access control method for accessing a particular terminal via the Internet or the like so as to control the terminal, a communication system to which the control is applied, and a server and a communication terminal, which are used for the communication system. More particularly, the present invention relates to processing performed when access requiring security management is performed.

2. Description of the Related Art

Hitherto, various kinds of operations have been proposed in which a household terminal disposed in each household and a server capable of remotely controlling the terminal are connected to each other via the Internet, so that the state within the household is externally monitored or devices within the household are remotely controlled.

In this case, for communication between the household terminal and the server, preferably, communication in which security management is performed is performed so that only a pre-registered server is connected to and remotely controls the household terminal.

In a conventional technique for performing communication in which security is ensured, there is a known technique which is performed by setting, for example, a communication path called a "VPN (Virtual Private Network)". VPN is a secure communication path that is constructed in the Internet by using tunneling technology and encryption technology. By applying this VPN technology, it is possible to ensure security comparable to the case in which a dedicated communication line is provided. However, when this VPN is applied, a dedicated router of a special configuration, which is compatible with VPN, is needed in the household, and this is not a common practice. As a communication method in which dedicated security ensuring means like this VPN is not needed, a process described in, for example, Japanese Unexamined Patent Application Publication No. 2003-60800, has been proposed.

For the processing described in Japanese Unexamined Patent Application Publication No. 2003-60800, a communication method applied to a home security system is employed. More specifically, the following is described. When a home network center receives a service request regarding the state of a device in the household from an external user terminal such as a cellular phone terminal, access to the communication household terminal is performed by dial-up connection from the home network center, the device within the household is operated via the accessed communication terminal, and the access to the server from the communication household terminal is also performed by dial-up connection using a telephone line.

In such a dial-up connection as that described in Japanese Unexamined Patent Application Publication No. 2003-60800, since the server on the home network center side and the communication terminal are connected in a one-to-one relationship, security higher than that through communication means such as the Internet is ensured. However, in dial-up connection using a telephone line, a communication fee (telephone fee) occurs each time the communication is performed, and a problem arises in that an enormous cost is incurred to manage the system.

In one of the techniques for solving this problem, processing is performed by a so-called polling method in which, by applying communication of an HTTPS (Hypertext Transfer Protocol Secure) system, which is a security-managed communication method which is possible only when, for example, access is performed from the communication terminal to the server (that is, it is not possible when access is performed from the server to the communication household terminal), connection to the server is periodically made from the communication terminal disposed within the household after security is ensured, and communication is performed between the household terminal and the server.

Figure 10:
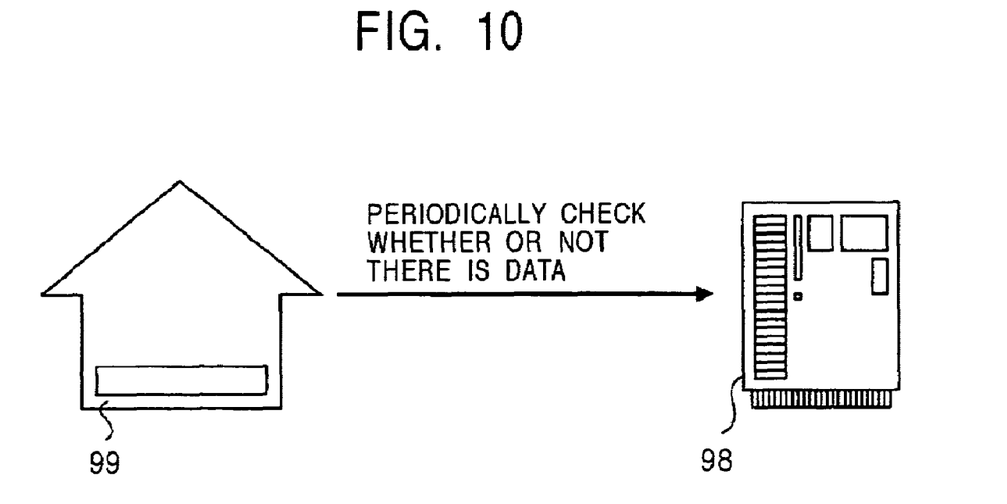
FIG. 10 is an illustration showing the overview of a conventional polling method.

FIG. 10 shows the overview of this polling method. A terminal 99 within the household is periodically connected to a home server system 98 via the Internet in HTTPS system communication in which security is ensured. At the time the connection is made, when there is data to be transmitted from the household terminal 99 to the server 98, the data is transmitted, and when there is data to be transmitted in both the home server system 98 and the terminal 99, the terminal 99 receives the data. As a result of applying this system shown in FIG. 10, security can be ensured comparatively easily. However, in the case of this polling method, since the server can only communicate with the household terminal at certain predetermined times, application to services requiring real-time characteristics is difficult. Furthermore, on the server side, when there is data to be transmitted to the household terminal, the data to be sent needs to be held until access is performed from the terminal at the next polling, and thus the load on the server becomes heavy.

SUMMARY OF THE INVENTION

An object of the present invention is to be capable of performing communication between a terminal connected to the Internet, like a terminal within a household, and a server by simple processing at any time after security is ensured.

In the present invention, in a case where control of a particular terminal connected to a predetermined network is performed from a server, when there is a predetermined processing request at the particular terminal from the server or an external terminal connected to the server, the server sends a callback request to the particular terminal. At the particular terminal receiving the callback request, a callback request response is made to the server by a predetermined communication method in which security is ensured. Based on the response from the server with regard to the callback request response, instructions for performing predetermined processing by a predetermined communication method are sent to the particular terminal.

As a result of the above, communication between the particular terminal and the server becomes possible on the basis of a request from the server by applying a known communication method in which security is ensured, which can be applied to a case in which connection from the terminal to the server is made via the Internet or the like.

According to the present invention, it becomes possible to easily make the terminal perform a predetermined process in response to a request from the server at any time after security is ensured. A device for performing a special encryption process on the terminal side needs not to be provided, and also, communication means such as the Internet can be used. As a result, there is no problem of a communication fee as in dial-up connection, and a system capable of remotely controlling a household terminal at any time can be constructed with a simple construction at a low cost.

In this case, a particular terminal disposed within the household can be accessed satisfactorily via the Internet because an IP address and a port number, at which a callback request from the server is received, are registered in advance in the server, and a callback request is transmitted from the server to the registered IP address and port number.

Furthermore, when a callback request is to be transmitted from the server to the particular terminal, data for specifying the server is added, and the particular terminal that transmits a callback request response transmits the callback request response to the specified server. As a result, for example, in a case where a plurality of servers to which the particular terminal can be connected are provided inside the home server system, the server and the particular terminal can be made to have a one-to-one correspondence, and control via the server can be performed reliably.

Furthermore, when there is a predetermined processing request at the particular terminal from an external terminal, the processing content contained in the request from the external terminal is stored in the server, and the stored processing content, which is added to the response, is sent to the particular terminal. As a result, operation, monitoring and the like of the particular terminal from the external terminal via the server can be performed after security is ensured. Furthermore, even if a third party poses as a server and illegally transmits a callback request to the particular terminal, since the server to which the particular terminal makes a callback request response is determined in advance, the unauthorized request of the third party is not performed, and this is effective for countermeasures against posing.

In this case, when the completion notification and/or the execution result of the processing content indicated by the response are sent from the particular terminal to the server, the received result notification and/or execution result are stored in the server, and the stored result notification and/or execution result are transmitted, as a response to the request, to the external terminal. This makes it possible to externally allow a terminal to know the processing result.

DESCRIPTION OF THE PREFERRED EMBODIMENTS

An embodiment of the present invention will now be described below with reference to FIGS. 1 to 9.

Figure 1:
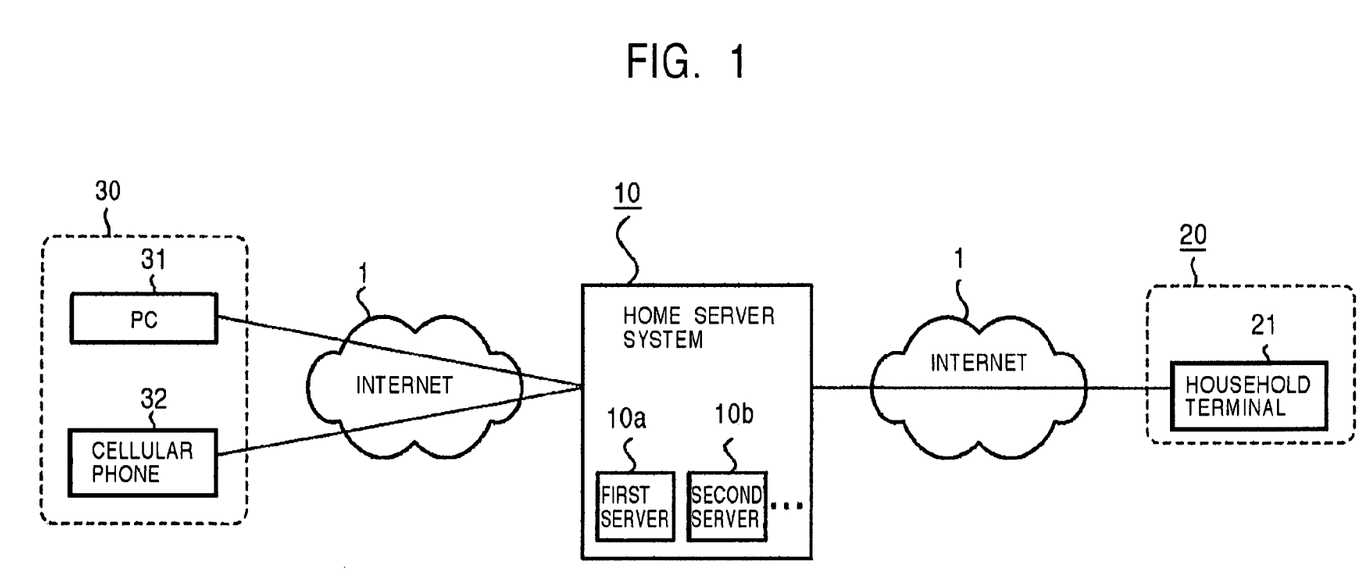
FIG. 1 is an illustration showing an example of the configuration of a network according to an embodiment of the present invention.

FIG. 1 shows an example of the configuration of the entire system of this example. In this example, a household terminal 21, disposed within the user's home 20, is connected to the Internet 1, so that a user 30 away from home monitors and remotely controls the state within the household by using a data communication terminal 31 such as a computer device. In this case, the household terminal 21 is connected via the Internet 1 to a home server system 10 provided in a dedicated manner in the system of this example. Also, the data communication terminal 31 outside the household is connected to the home server system 10 via the Internet 1, so that data is transferred to and from the data communication terminal 31 via the home server system 10. Furthermore, the system is constructed in such a manner that, for the terminal outside the household, a cellular phone terminal 32 can also be used in addition to a terminal such as a computer device. For the cellular phone terminal 32, for example, a terminal capable of accessing the Internet is used.

In FIG. 1, an example is shown in which only a set, that is, the household terminal 21 and the data communication terminal 31 outside the household are connected to the home server system 10. In practice, however, a large number of sets of users are connected to the home server system 10, and the home server system 10 performs the management of the individual users. Furthermore, for the home server system 10, in practice, a system in which a plurality of servers 10a, 10b, . . . are provided, and a large number of users can use them simultaneously is constructed.

Figure 2:
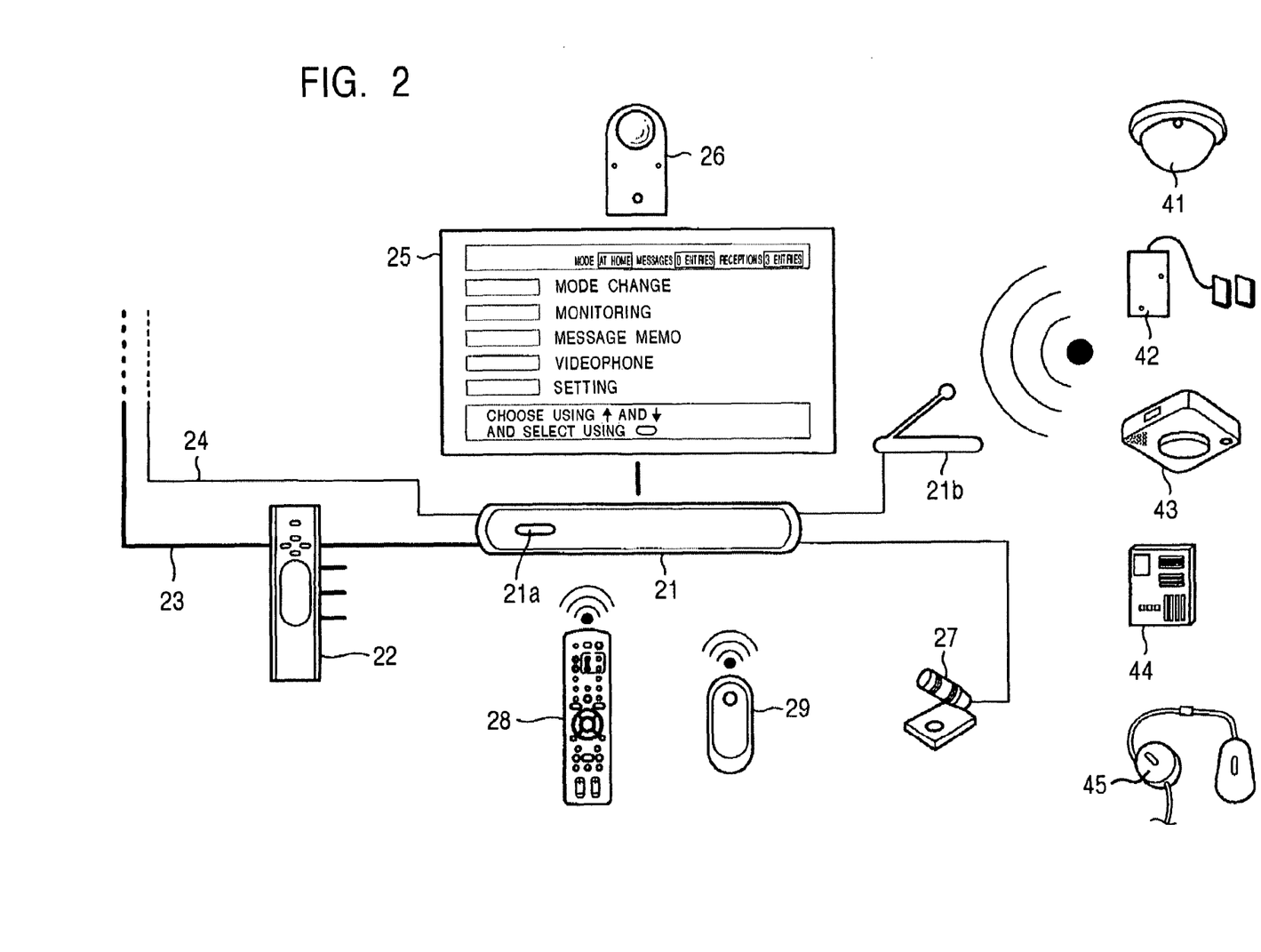
FIG. 2 is an illustration showing an example of the configuration of the entire household according to the embodiment of the present invention.

FIG. 2 shows an example of the configuration in which a connection is made to the household terminal 21, disposed within the user's home 20. The main terminal unit 21 within the household is connected to a broadband line 23 (in practice, a telephone line) for connection with the Internet via a modem router 22 for ADSL (Asymmetric Digital Subscriber Line) line, and is also directly connected to a telephone line 24, so that data is transferred to and from a peripheral device of the household terminal 21. More specifically, for example, the household terminal 21 includes a remote-control signal reception section 21a so as to receive a remote-control signal (an infrared signal, etc.) of each device from a remote controller 28 and so as to receive a remote-control signal for instructing the locking or unlocking from a remote key 29. Based on the reception of these remote-control signals, the corresponding device control is performed. Furthermore, an RF antenna 21b is connected to the household terminal 21, so that the RF antenna 21b receives a person-at-home or intruder detection signal at a person sensor 41, an opening/closing detection signal at a window/door sensor 42, a fire detection signal at a fire sensor 43, a gas leakage detection signal at a gas leakage sensor 44, and an operation signal of an emergency button 45. Based on these reception signals, a process which is set in advance, such as notification to a data communication terminal of a specific user, is performed.

Furthermore, a display unit 25, a camera 26, and a videophone microphone 27 are connected to the main terminal unit 21 within the household. The display unit 25 displays the current mode (the at-home mode, the going-out mode, etc.) of the household terminal 21, the monitoring state of each device, a message memo received externally, the video image of the other party or oneself when the display unit 25 is used as a videophone, and a display regarding other various kinds of settings. When the display unit 25 is used as a videophone so as to make a conversation with a video image with the outside, the camera 26 and the videophone microphone 27 are used. The change of these displays at the display unit 25 can be performed by operating, for example, the remote controller 28.

The communication with the home server system 10 is performed basically via the broadband line 23, such as ADSL. In the case of a situation where the broadband line 23 cannot be used and in the case where reporting having a high level of emergency is needed, it is possible to contact the home server system 10 or another determined party by dial-up connection using the telephone line 24. The broadband line 23 is not restricted to ADSL, and various kinds of broadband lines which can be connected to the Internet, such as a broadband line using optical cables and a wireless broadband line, can be applied.

Figure 3:
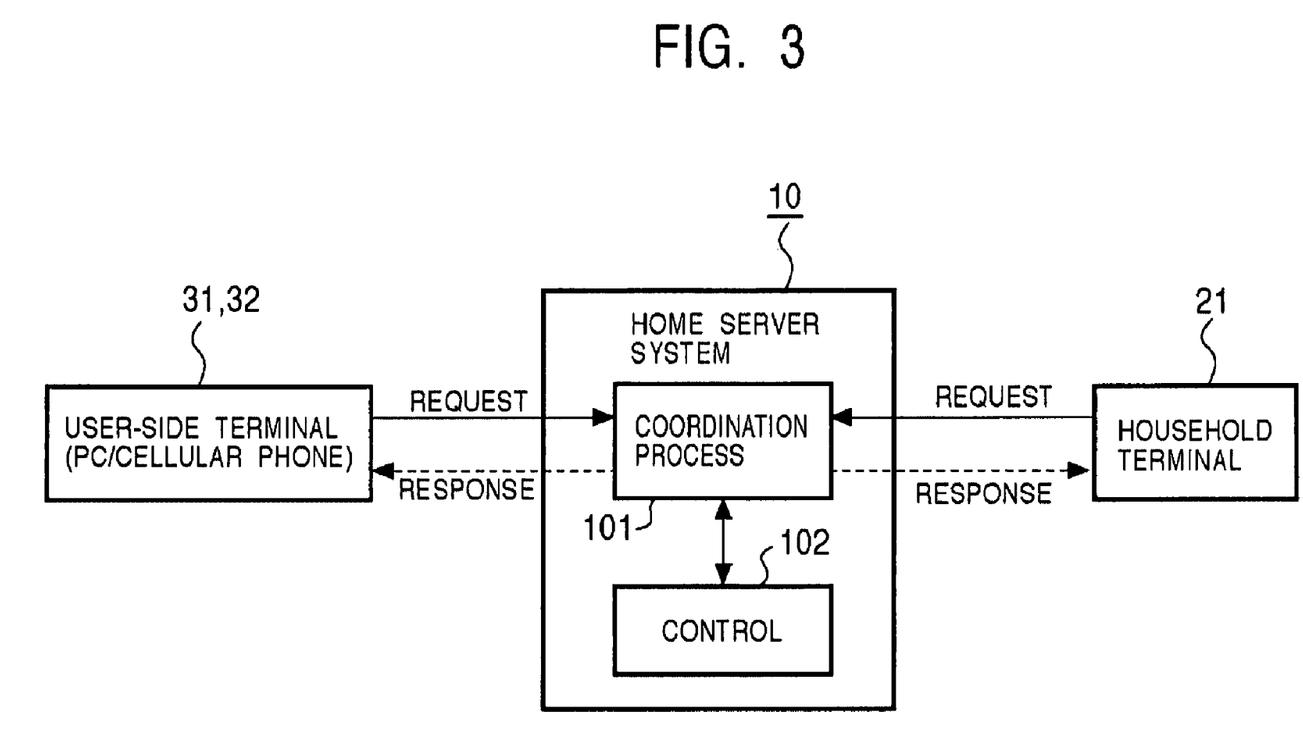
FIG. 3 is an illustration showing an example of the connection configuration of a user away from home and a household according to the embodiment of the present invention.

A description will now be given, with reference to FIG. 3, of a connection example via the home server system 10 in a case where communication is performed with the main terminal unit 21 within the household via the Internet. The data communication terminal 31 or the cellular phone terminal 32, which is a terminal of the user away from home, performs data transfer with the household terminal 21 via the home server system 10, and a request for performing some processing in the household terminal 21 is sent from the external terminal 31 or 32 to the home server system 10. The request is sent to a processing section which functions as coordination processing means 101 inside the home server system 10, whereby the request is sent to the household terminal 21 under the control of server control means 102. The processing result is sent back as a response to the request from the home server system 10 to the external terminal 31 or 32. For the connection between the home server system 10 and the household terminal 21, basically, a request is sent from the household terminal 21, and a process for sending a response with respect to the request from the home server system 10 to the household terminal 21 is performed. During the transmission of the request from the household terminal 21, communication in which security management is performed is performed. That is, by sending a request to the home server system 10 from the communication terminal disposed inside the household by applying an HTTPS-system communication, which is a communication method in which security management is performed, which is possible only when access is performed from the communication terminal side to the server, the security-managed communication is started between the household terminal 21 and the home server system 10.

Figure 4:
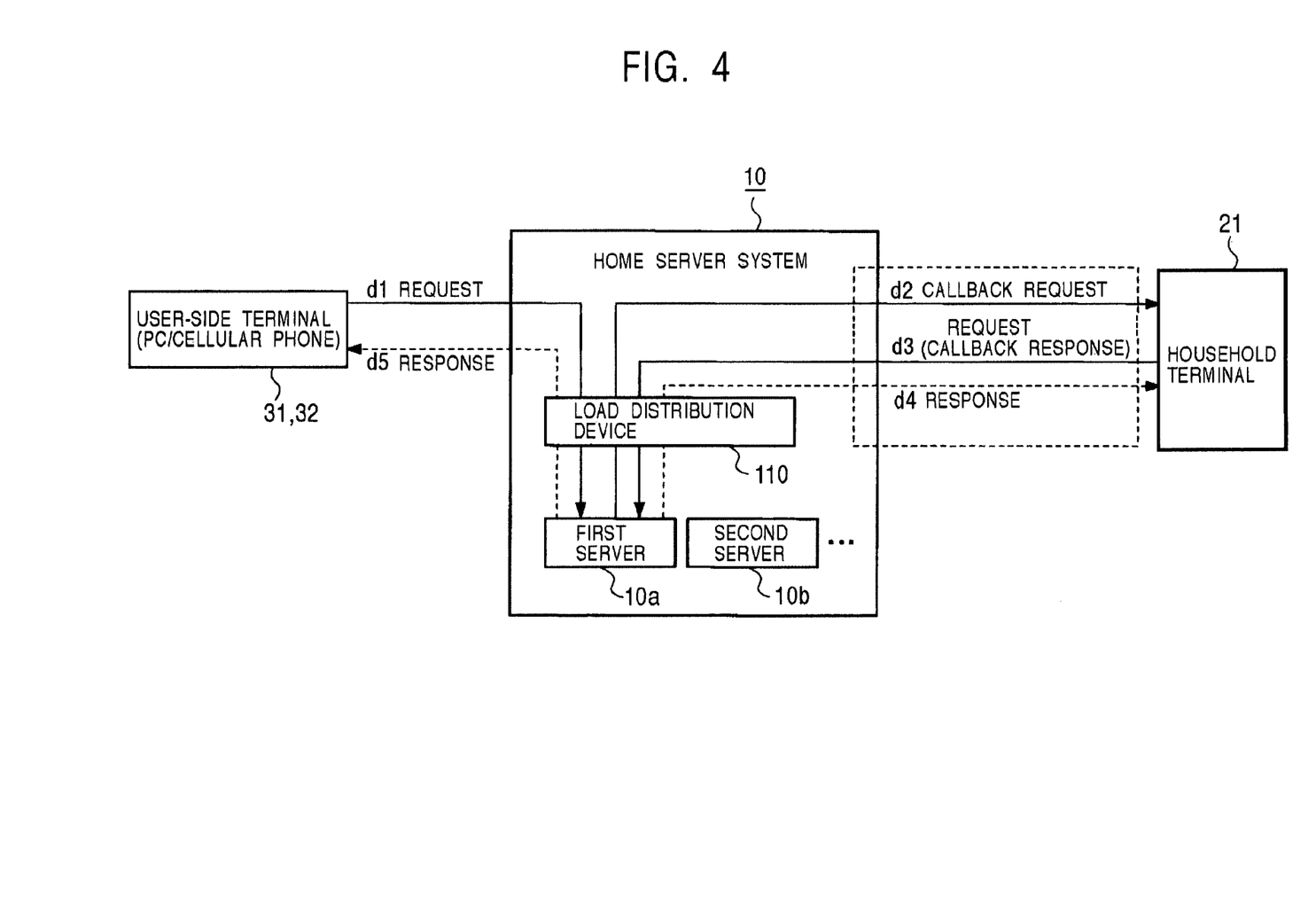
FIG. 4 is an illustration showing an example of a coordination process in a server according to the embodiment of the present invention.

A more detailed example of processing will now be described below with reference to 4. In the case of this example, inside the home server system 10, a plurality of servers 10a, 10b, . . . are provided, and processing is performed in a distributed manner among the servers so that simultaneous access from a large number of users can be dealt with. Since the plurality of servers 10a, 10b, . . . are provided, a load distribution device 110 is provided, so that requests transmitted to the home server system 10 are distributed among the servers. Here, when data for specifying the server is added to the received request, the load distribution device 110 sends the received request to the specified server. For example, when the load distribution device 110 determines that data for specifying a first server 10a is added to the request from the household terminal 21, the request is sent to the first server 10a. Even when a plurality of servers 10a, 10b, . . . are provided inside the home server system 10, a database which is used commonly among the servers 10a, 10b, . . . may be provided so as to share the data. For example, data on the users and the terminals within the household, which are managed by the home server system 10, is registered in the database which is commonly used among the servers.

Examples of processing performed when there is a request from the external user side terminal 31 or 32 will now be described in sequence with reference to FIG. 4. Initially, when a request d1 for controlling the particular household terminal 21 is sent from the external user side terminal 31 or 32 via the Internet, inside the home server system 10, the load distribution device 110 sends the request d1 to one particular server. It is assumed here that, for example, the request is sent to the first server 10a. The transmission of the request from the external user side terminal 31 or 32 to the home server system 10 is performed in principle by communication in which security management is performed, such as HTTPS communication.

Figure 5:
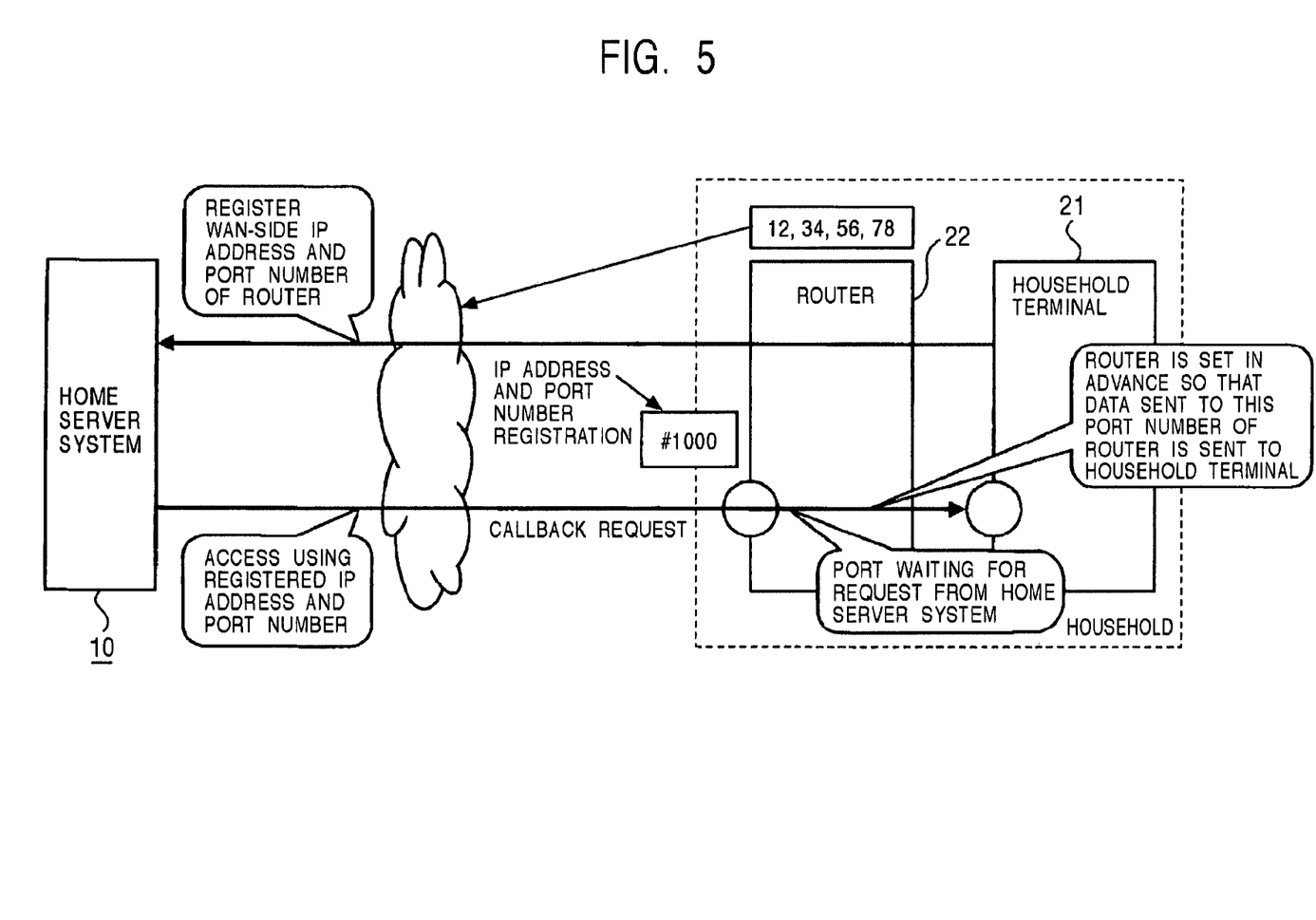
FIG. 5 is an illustration showing an example of an IP address registering process according to the embodiment of the present invention.

The server 10a receiving this request discriminates as to which household terminal is controlled by the request, and sends via the Internet a callback request d2 to the household terminal 21, which is the discriminated particular terminal. The household terminal 21 is connected to the broadband line via the modem router 22, as shown in FIG. 2. The WAN-side IP address and the standby port number of the router 22 are registered in the home server system 10, and the callback request d2 is sent by using the registered IP address and port number as the destination. The callback request d2 is an access from the server, which is communication in which security is not managed, with data for identifying the first server 10a that has transmitted this request d2 being added thereto. In the process for registering the IP address and the port number, for example, as shown in FIG. 5, the WAN-side IP address and the standby port number of the modem router, which are transmitted from the modem router 22 to the household terminal 21, are registered in advance in the home server system 10, so that they are stored in the database which is used commonly among the servers inside the home server system 10. Then, when each server inside the home server system 10 makes a callback request, the IP address and the port number stored in the database are set to the IP address and the port number of the destination for which the callback request is transmitted. When the IP address is not fixed and the IP address assigned to the modem router 22 is changed, the IP address is notified from the household terminal 21 or the modem router 22 to the home server system 10. The change and the notification of the IP address are possible, for example, by using a protocol for finding and controlling the device tailored for a home network, such as UPnP.

Referring back to FIG. 4, the household terminal 21 receiving the callback request d2 transmits a request d3 as a callback response. The transmission of the request d3 at this time is performed by a communication method in which security is managed, such as HTTPS system, with data for indicating the first server 10a, which is the transmission source of the callback request, being added thereto. As a result the data indicating the first server 10a being added, the load distribution device 110 inside the home server system 10 sends the request d3 to the first server 10a. The subsequent communication between the household terminal 21 and the first server 10a is basically communication in which security is managed.

Then, when the first server 10a receives the request d3 as the callback response, the processing content indicated by the request d1 from the external user side terminal 31 or 32 is transmitted as a response d4 for the request from the first server 10a to the household terminal 21, and the processing content indicated from the user side terminal 31 or 32 is transmitted to the household terminal 21.

After the processing at the household terminal 21 is performed in this manner, a response d5 is also transmitted from the first server 10a to the user side terminal 31 or 32. Also, when this response d5 is transmitted, data by which the first server 10a can be specified may be added thereto.

Figure 6:
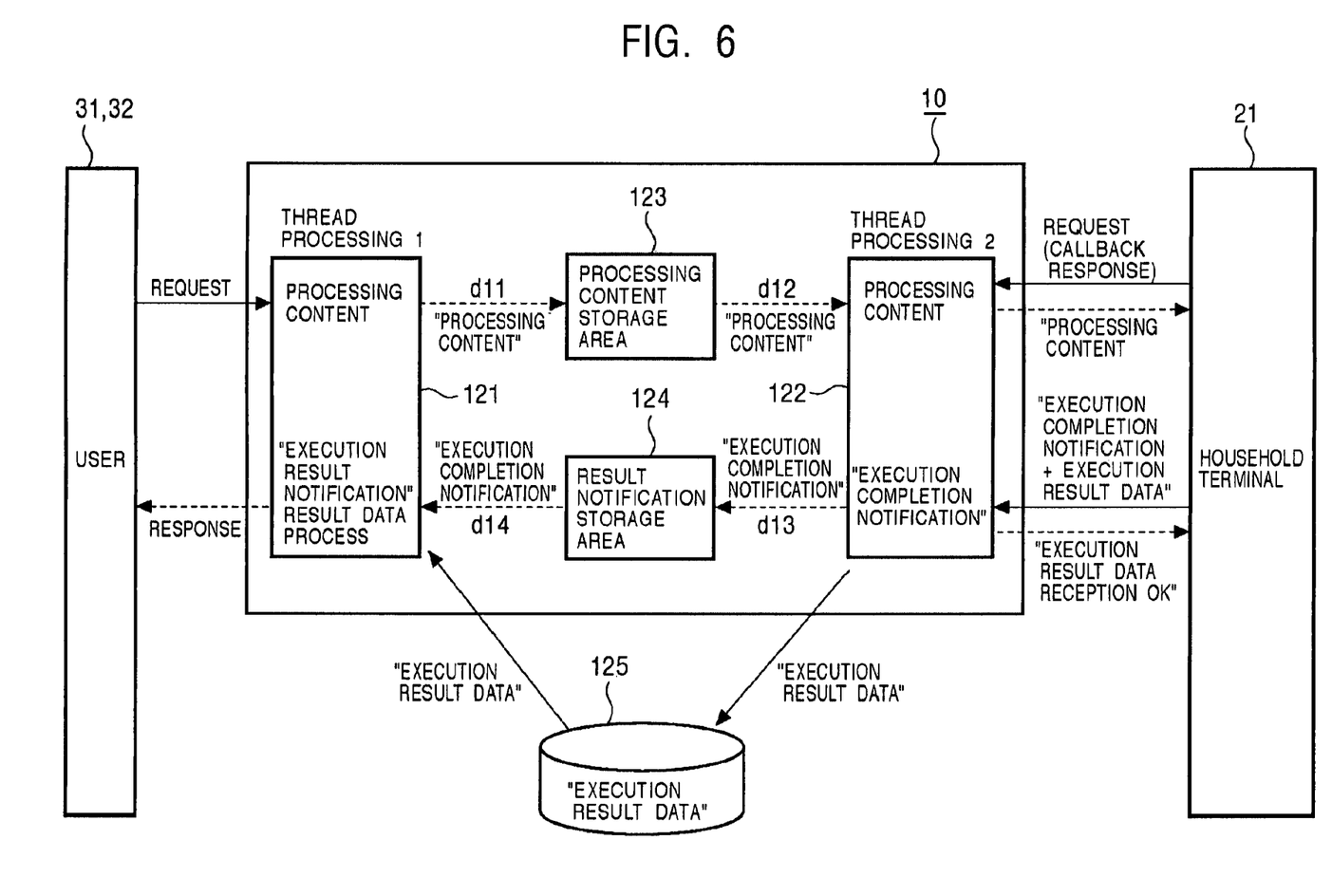
FIG. 6 is an illustration showing the details of a coordination process according to the embodiment of the present invention.

Next, the details of the coordination operation between the external user side terminal 31 or 32 and the household terminal 21, inside the home server system 10, will now be described below with reference to FIG. 6. In each server inside the home server system 10, the coordination process, which is called a "thread process", between the user side terminal 31 or 32 and the household terminal 21, becomes necessary. More specifically, a processing section functioning as first thread processing means 121 for coordination with the external user side terminal 31 or 32, and a processing section functioning as second thread processing means 122 for coordination with the household terminal 21 are provided inside the same server. As data storage areas for connection between the two processing means 121 and 122, a processing content storage area 123, a result notification storage area 124, and an execution result database 125 are provided. The execution result database 125 may be a database which is commonly used among the servers inside the home server system 10.

Specific processing will now be described below with reference to FIG. 6. Initially, when a request for executing the processing content of the particular household terminal 21 from the external user side terminal 31 or 32 is received by the server (for example, the server 10a) inside the home server system 10, the first thread processing means 121 extracts the processing content d11 and stores it in the processing content storage area 123 inside the server. Then, when the second thread processing means 122 receives the request as the callback response from the household terminal 21, the second thread processing means 122 reads the processing content stored in the processing content storage area 123 and transmits the read processing content d12, as the response for the request, to the household terminal 21.

When the processing content is executed in the household terminal 21, and the execution completion notification and the execution result data are sent to the server, the execution completion notification d13 is extracted by the second thread processing means 122 and is stored in the result notification storage area 124, and the execution result data is stored in the execution result database 125. Then, the first thread processing means 121 periodically checks the data stored in the result notification storage area 124. When the execution completion notification d14 stored in the result notification storage area 124 is detected, the execution result data stored in the database 125 is obtained, and the execution result data is transmitted as a response to the external user side terminal 31 or 32.

A series of processing, such as processing in the first thread processing means 121 and processing in the second thread processing means 122, can be unified with the related processing by using data called a "logical path ID" issued inside the server. Furthermore, in the result notification storage area 124, not only the execution completion notification, but also the execution result data may be stored, or only the execution result data may be stored. Furthermore, the processing content storage area 123 and the result notification storage area 124 may be set by using the memory storage area provided in the processing section which functions as the first thread processing means 121 or the second thread processing means 122 inside the server.

In the case of this example, as an authentication process required to perform communication in which security management is performed between the server and the household terminal, the following authentication process is performed. That is, as an authentication at the household terminal when access is performed from the server, digest authentication is performed. This digest authentication is such that, rather than causing data used for authentication to be passed to the network, the hash (one-direction function) of the data is used to perform an authentication. Furthermore, as the authentication at the server when the server is accessed from the household terminal, device authentication and digest authentication are performed. The device authentication is not an authentication of the user, but an authentication of the device itself connected to the network, and is an authentication using a unique identification number (ID) embedded in advance in the device. In the modem router connected to the household terminal, the security level can be increased further by performing packet filtering. The packet filtering is a process for examining packets sent from the modem router so as to make a determination as to whether or not the packets should be passed.

Figure 7:
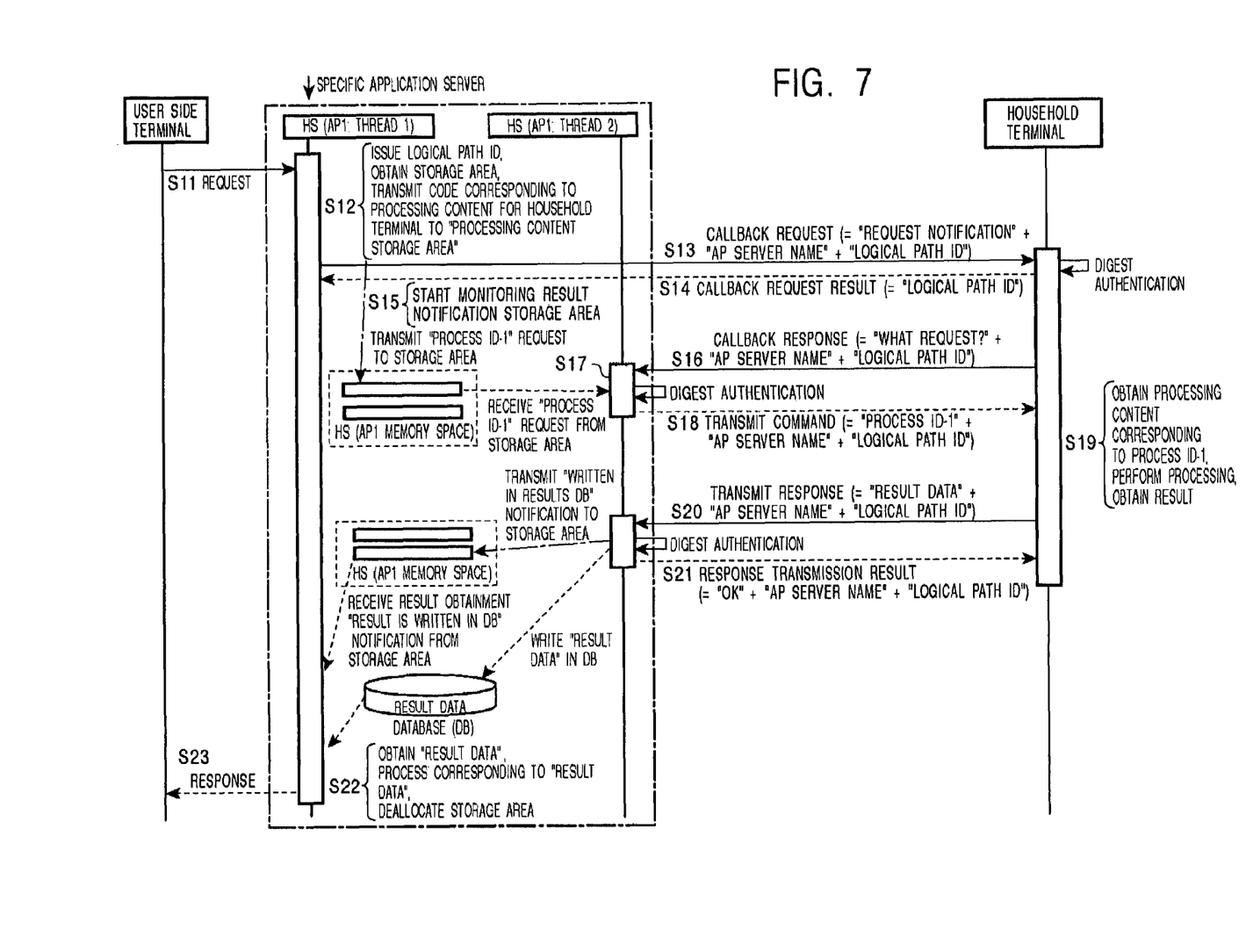
FIG. 7 is a sequence diagram showing an example of processing among a user side terminal, a server, and a household terminal according to the embodiment of the present invention.

Next, referring to FIG. 7, a description will be given below of an example of the sequence of processing performed between the external user side terminal and the household terminal in this manner. Initially, a request for instructing that processing of some content be performed at a particular household terminal is transmitted from the user side terminal to the first thread processing means inside the server (step S11). This request is made by an HTTPS communication in which security is ensured. When this request is received, inside the server, a logical path ID is issued, a data storage area is allocated, and a code corresponding to the processing content on the household terminal 21 is sent to the processing content storage area (step S12). Thereafter, the first thread processing means transmits a callback request to the household terminal (step S13). A request notification indicating that a callback request is made, data for identifying the application server name for performing this process, and the logical path ID are added to the callback request.

The household terminal receiving this callback request performs digest authentication, confirms that it is a callback request from a valid server, and sends back a logical path ID as the callback request result (step S14). The sending back of this callback request result is basically a communication in which security is not yet ensured, and data transfer in steps S13 and S14 is so-called HTTPS communication. When the callback request result is received on the server side, in the first thread processing means 121, periodic monitoring of the result notification storage area is started (step S15). Here, when a processing request of code ID-1 occurs from an external terminal, the processing request ID-1 is stored in the processing content storage area 123.

Then, when a slight amount of time elapses from when the callback request is received on the household terminal side, a callback response is made (step S16). For this callback response, an HTTPS communication in which security is ensured is performed. In the callback response, data for inquiring as to what kind of request it is, the server name indicated in the callback request in step S13, and the logical path ID are added. This callback response is received by the second thread processing means 122 of the server, and a digest authentication is performed (step S17). When it is determined that the response is a response from the valid household terminal, the processing request code ID-1 stored in the processing content storage area 123 is read, the processing request code ID-1, which is added to the response for the callback response, is transmitted at the second thread processing means 122 of the server (step S18). At this time, in addition to the processing request code ID-1, the server name and the logical path ID are added to the response and are transmitted, and this is performed as an HTTPS communication in which security is ensured.

Then, when the processing request code ID-1 is received at the household terminal, processing content corresponding to the processing request code ID-1 is determined, and the processing is performed. Then, the processing result is obtained (step S19). When the processing result is obtained at the household terminal, a response is transmitted to the server (step S20). The transmission of this response is also performed as a request of an HTTPS communication in which security is ensured, and the result data, the server name, and the logical path ID are added thereto.

The server side receiving this response transmission performs digest authentication, confirms that it is a transmission from a valid household terminal, and sends back the response transmission result as a response to the household terminal (step S21). When this response transmission result is sent back, it is performed as a response of HTTPS communication in which security is ensured, and data indicating that the processing is completed, the server name, and the logical path ID are added thereto.

Then, when result data is transmitted from the household terminal, the transmitted processing result is written into the results database, the fact that the results are written into the database is stored in the result notification storage area 124, and also, the result data is written into the database (step S22). When this result data is obtained, a process corresponding to the result data is performed inside the server, and based on the data written into the result notification storage area 124, a response is made to the user side terminal 31 or 32 (step S23). When the processing up to this point is completed, the processing content storage area 123 and the result notification storage area 124, which are allocated in step S12, are deallocated.

Figure 8:
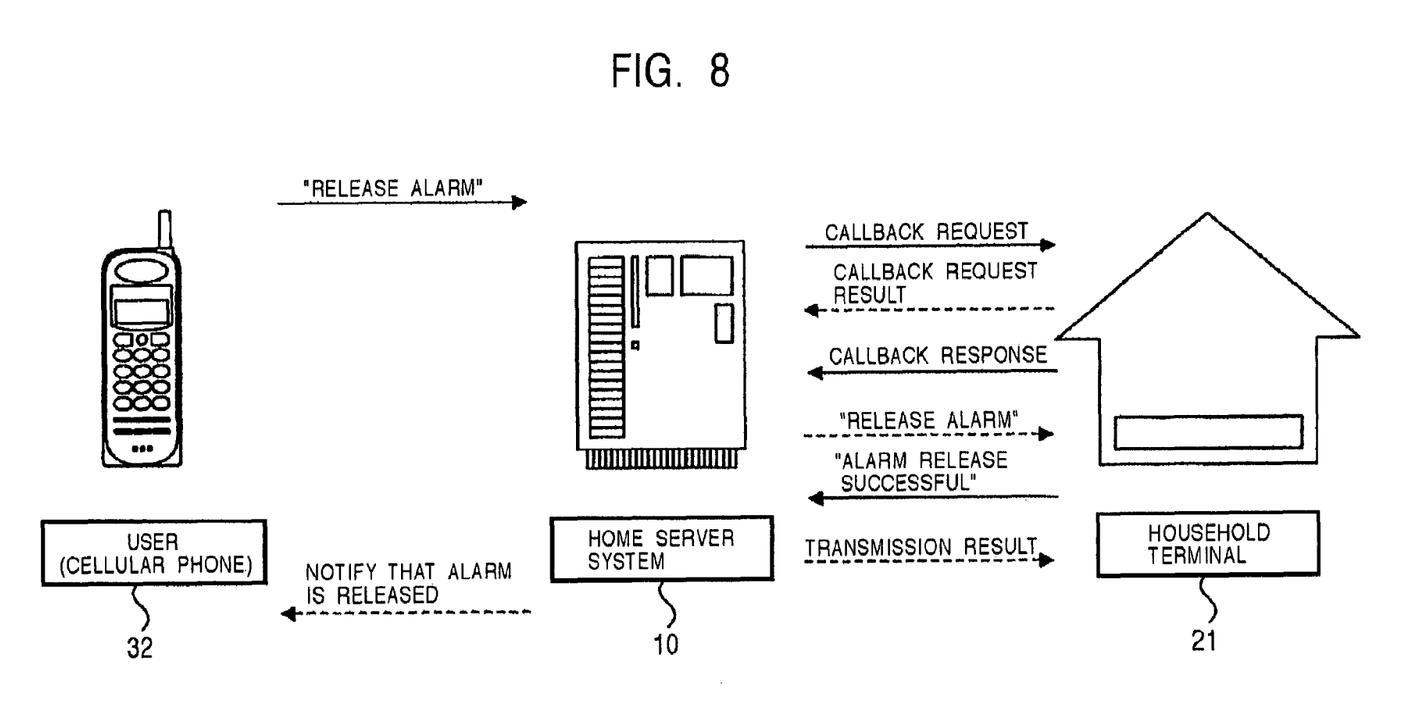
FIG. 8 is an illustration showing an example of an alarm releasing process according to the embodiment of the present invention.

Next, an example of the processing content to be performed in practice in the processing shown in FIG. 7 will be described below with reference to FIGS. 8 and 9. In this example, as shown in FIG. 8, an alarm releasing process for releasing the alarm state generated in one of the devices set within the household in which the household terminal 21 is disposed is performed from the external user side terminal 32. More specifically, as shown in FIG. 8, a request indicating an alarm release as a processing content is transmitted to the server inside the home server system 10 from the user side terminal 32. The server receiving the request performs the callback request which has already been described starts communication in which security is ensured on the basis of a response for the callback request, and transmits the processing content of the alarm releasing to the household terminal 21 on the basis of a response for the callback request response.

Thereafter, when the instructed alarm releasing is successful in the process within the household under the control of the household terminal 21, the alarm releasing success is transmitted to the server, and the fact that the alarm is released is notified from the server to the user side terminal 32.

Figure 9:
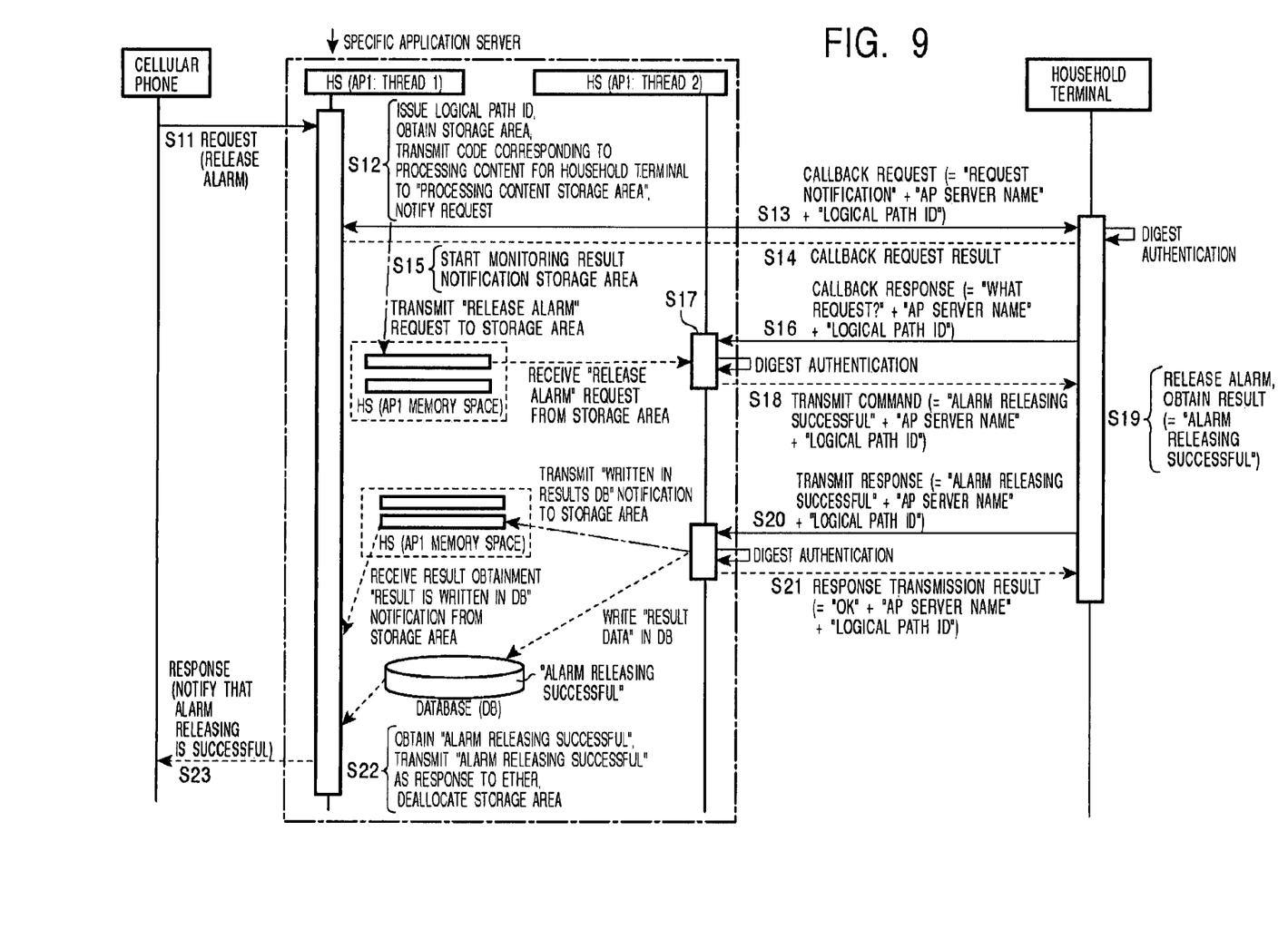
FIG. 9 is a sequence diagram of an example of the alarm releasing process according to the embodiment of the present invention.

A detailed example of a processing sequence in this case is shown in FIG. 9. The sequence diagram of FIG. 9 is basically the same as the sequence diagram shown in FIG. 7, and the same step numbers as those in FIG. 7 are assigned. In the case of the example of FIG. 9, a process represented as a processing code (processing ID-1) in the example of FIG. 7 is represented as "alarm releasing", which is a specific process. When the alarm releasing succeeds in the household terminal, "alarm releasing successful" is sent to the server and is finally sent to the user side terminal (cellular phone terminal) 32. The response in the final step S23 may be sent as "alarm releasing successful" to the cellular phone terminal 32, for example, by mail of characters.

Since control from outside the household terminal 21 can be performed with the server in this manner while performing communication in which security is ensured, a system in which unauthorized access is excluded can be constructed.

In the above-described embodiment, when there is a request from an external user side terminal, a callback request is sent from the server to the household terminal. Alternatively, for example, even if there is no request from the external user side terminal, a callback request may be sent to the household terminal in the original process from the server, so that the household terminal performs some processing.

In the above-described embodiment, as a terminal connected to the server, a terminal disposed within the household is used. Alternatively, a terminal requiring various kinds of management, which is disposed in another location, may also be used.

Furthermore, TCP (Transmission Control Protocol) connection may be always established (connection at all times) from the household terminal to the server, and a callback request may be transmitted from the server to the household terminal by using the connection. In this case, the security level can be increased further.

What is claimed is:

1. A method for controlling a home terminal on a home network from an external terminal through a server, the home terminal, the external terminal, and the server being connected to a network, the method comprising:

receiving, by the server, a processing request for the home terminal from the external terminal;

allocating, by the server, a storage area on the server for the home terminal in response to the processing request;

issuing, by the server, a logical path ID identifying the storage area for the home terminal;

storing, by the server, an instruction for performing the processing request in the storage area for the home terminal;

sending, by the server, a first message to the home terminal, the first message containing a name of the server and the logical path ID;

sending, by the home terminal, a second message to the server using a secure communication method in response to the first message, the second message containing an inquiry as to a type of the processing request, the name of the server, and the logical path ID; and in response to receiving the second message from the home terminal:

performing, by the server, a digest authentication process on the home terminal;

determining, by the server and based on a result of the digest authentication process, whether the second message is from a valid home terminal;

when it is determined that the second message is from a valid home terminal, retrieving, by the server, the instruction for performing the processing request from the storage area on the server for the home terminal; and sending, by the server, a third message containing the instruction for performing the processing request to the home terminal using the secure communication method.

2. The method of claim 1, wherein:

the home terminal registers in advance with the server an IP address and a port number at which the first message is to be received, and the first message is transmitted from the server to the registered IP address and the port number.

3. The method of claim 1, further comprising storing, by the server, content contained in the processing request in the storage area for the home terminal, wherein the stored content is added to the third message and sent to the home terminal.

4. The method of claim 3, further comprising:
sending, by the home terminal, a fourth message containing an execution result of the content;
storing, by the server, the execution result; and
transmitting, by the server, the stored execution result to the external terminal.

5. A communication system for controlling a home terminal on a home network from an external terminal through a server, the home terminal, the external terminal, and the server being connected to a network, the communication system comprising:
first control means associated with the server for:
receiving a processing request for the home terminal from the external terminal;
allocating a storage area on the server for the home terminal in response to the processing request;
issuing a logical path ID identifying the storage area for the home terminal;
storing an instruction for performing the processing request in the storage area for the home terminal;
transmitting a first message to the home terminal in response to the processing request, the first message indicating a name of the server and the logical path ID;
receiving, from the home terminal and in response to the first message, a second message containing an inquiry as to the type of the processing request, the name of the server, and the logical path ID; and
in response to receiving the second message from the home terminal:
performing a digest authentication process on the home terminal;
determining, based on a result of the digest authentication process, whether the second message is from a valid home terminal;
when it is determined that the second message is from a valid home terminal, retrieving the instruction for performing the processing request from the storage area for the home terminal; and
transmitting, to the home terminal, a third message containing the instruction for performing the processing request using a secure communication method; and
second control means associated with the home terminal for:
sending the second message to the server using the secure communication method in response to receiving the first message from the server; and
executing the instruction for performing the processing request.

6. The communication system of claim 5, wherein:
the second control means registers in advance with the server, an IP address and a port number of the home terminal at which the callback request is to be received, and
the first control means transmits the first message to the registered IP address and the port number.

7. The communication system of claim 5, wherein:
the server includes means for storing content contained in the processing request in the storage area for the home terminal, and the first control means adds the stored content to the third message and sends the third message to the home terminal.

8. The communication system according to claim 7, wherein:
the second control means sends a fourth message to the server containing an execution result of the content;
the server includes means for storing the execution result, and
the first control means transmits the stored execution result, in response to the processing request, to the external terminal.

9. A server for controlling a home terminal on a home network from an external terminal, the home terminal, the external terminal, and the server being connected to a network, the server comprising:
means for receiving a processing request for the home terminal from the external terminal; and
control means for:
allocating a storage area on the server for the home terminal in response to the processing request;
issuing a logical path ID identifying the storage area for the home terminal;
storing an instruction for performing the processing request in the storage area for the home terminal;
transmitting a first message to the home terminal in response to the processing request, the first message indicating a name of the server and the logical path ID;
receiving from the home terminal in response to the first message, a second message containing an inquiry as to a type of the processing request, the name of the server, and the logical path ID; and
in response to receiving the second message from the home terminal:
performing a digest authentication process on the home terminal;
determining, based on a result of the digest authentication process, whether the second message is from a valid home terminal;
when it is determined that the second message is from a valid home terminal, retrieving the instruction for performing the processing request from the storage area on the server for the home terminal; and
transmitting, to the home terminal, a third message containing the instruction for performing the processing request using a secure communication method.

10. The server of claim 9, wherein the control means transmits the first message to an IP address and a port number which are indicated and registered in advance by the home terminal.

11. The server of claim 9, further comprising means for storing content contained in the processing request in the storage area for the home terminal, wherein the control means adds the stored content to the third message and sends the third message to the home terminal.

12. The server according to claim 11, further comprising means for storing an execution result of the content indicated by a fourth message received from the home terminal, wherein the control means transmits the stored execution result, in response to the processing request, to the external terminal.

* * * * *